(12) United States Patent
Holay et al.

(10) Patent No.: US 9,518,533 B2
(45) Date of Patent: Dec. 13, 2016

(54) DEVICE AND METHOD FOR ASSEMBLING A FIXED THRUST REVERSER STRUCTURE OF AN AIRCRAFT PROPULSION ASSEMBLY

(71) Applicant: AIRCELLE, Gonfreville l'Orcher (FR)

(72) Inventors: Xavier Holay, Le Havre (FR); Florine Duquenoy, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 115 days.

(21) Appl. No.: 14/568,582

(22) Filed: Dec. 12, 2014

(65) Prior Publication Data

US 2015/0113787 A1    Apr. 30, 2015

Related U.S. Application Data

(63) Continuation of application No. PCT/FR2013/051392, filed on Jun. 14, 2013.

(30) Foreign Application Priority Data

Jun. 25, 2012  (FR) ...................................... 12 55990

(51) Int. Cl.
| | |
|---|---|
| *F02K 1/06* | (2006.01) |
| *B64F 5/00* | (2006.01) |
| *F01D 25/28* | (2006.01) |
| *F02K 1/64* | (2006.01) |
| *F02K 1/74* | (2006.01) |

(52) U.S. Cl.
CPC ................ *F02K 1/06* (2013.01); *B64F 5/009* (2013.01); *B64F 5/0036* (2013.01); *F01D 25/285* (2013.01); *F02K 1/64* (2013.01); *F02K 1/74* (2013.01); *F05D 2230/68* (2013.01); *Y10T 29/49901* (2015.01); *Y10T 29/49998* (2015.01); *Y10T 29/53091* (2015.01)

(58) Field of Classification Search
CPC ................ F02K 1/06; F02K 1/64; F02K 1/74; F01D 25/285; B64F 5/009; B64F 5/0036; Y10T 29/53091; Y10T 29/49998; Y10T 29/49901; F05D 2230/68
See application file for complete search history.

(56) References Cited

U.S. PATENT DOCUMENTS

| | | | |
|---|---|---|---|
| 4,044,973 A | * | 8/1977 | Moorehead ............ B64D 27/26 244/54 |
| 4,200,273 A | | 4/1980 | Das Gupta et al. |
| 5,681,033 A | | 10/1997 | Bullen |

(Continued)

OTHER PUBLICATIONS

International Search Report issued Aug. 6, 2013 in International Application No. PCT/FR2013/051392.

*Primary Examiner* — John C Hong
(74) *Attorney, Agent, or Firm* — Buris Law, PLLC

(57) ABSTRACT

An assembly device includes a framework resting on a planar support, a support element mounted movably in rotation relative to the framework, an immobilizing device, and a positioning assembly mounted in rotation on the support element. A front frame of the fixed structure is positioned on the positioning assembly, and the immobilizing device is arranged to immobilize the front frame on the positioning assembly. In particular, the assembly device allows, in the immobilizing position on the positioning assembly, for the front frame to extend transversely to the planar support.

17 Claims, 6 Drawing Sheets

(56) References Cited

U.S. PATENT DOCUMENTS

| | | | |
|---|---|---|---|
| 8,646,724 B2 * | 2/2014 | Bonnet | B64D 27/26 188/378 |
| 8,840,061 B2 * | 9/2014 | Caruel | B64D 27/26 244/53 R |
| 2011/0204006 A1 | 8/2011 | Jacobs et al. | |

* cited by examiner

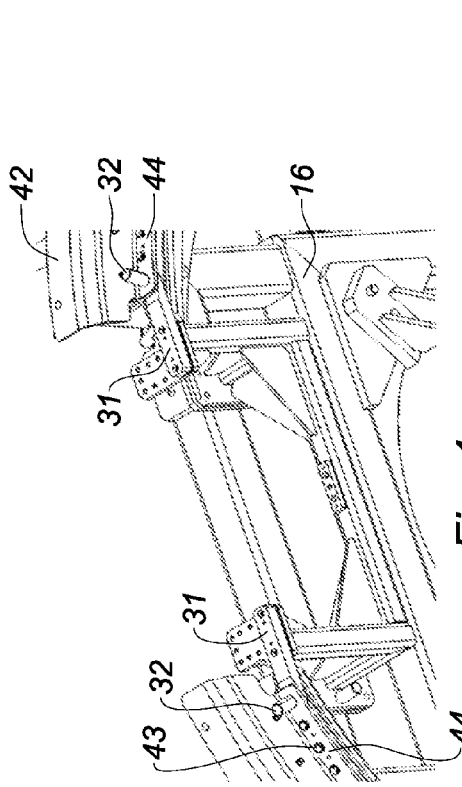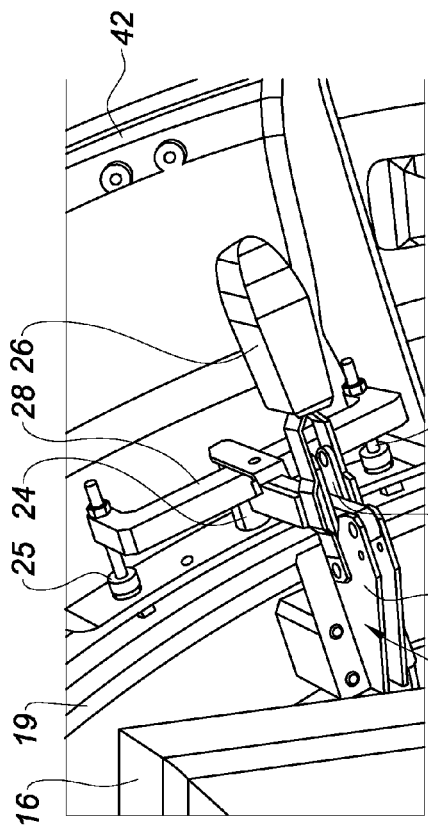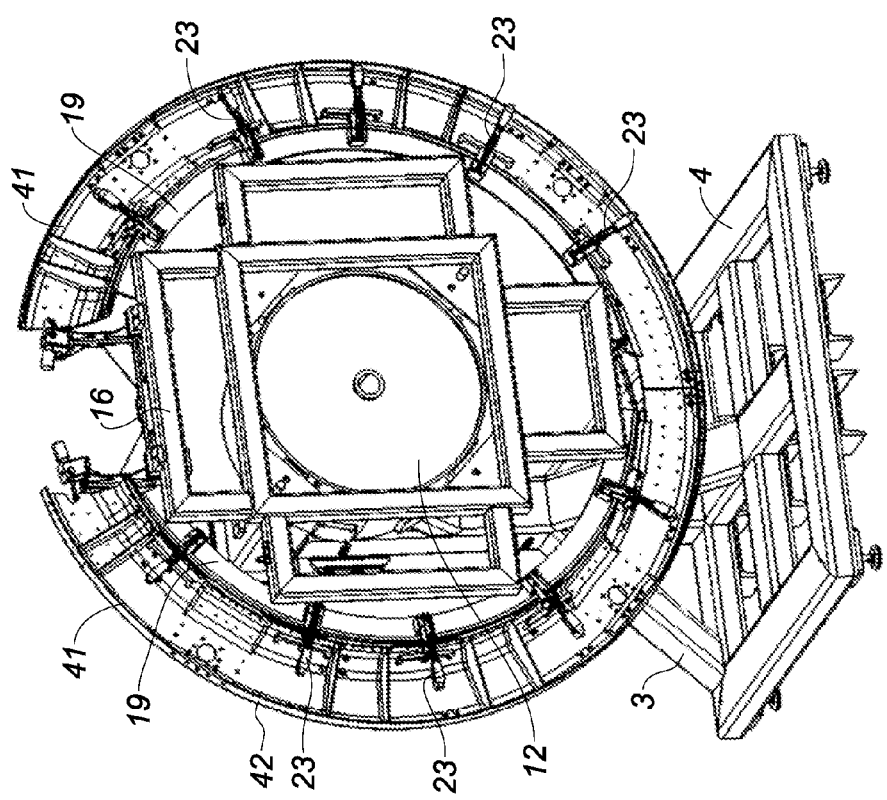

DEVICE AND METHOD FOR ASSEMBLING A FIXED THRUST REVERSER STRUCTURE OF AN AIRCRAFT PROPULSION ASSEMBLY

CROSS-REFERENCE TO RELATED APPLICATIONS

This application is a continuation of International Application No. PCT/FR2013/051392, filed on Jun. 14, 2013, which claims the benefit of FR 12/55990, filed on Jun. 25, 2012. The disclosures of the above applications are incorporated herein by reference.

FIELD

The present disclosure relates to a device for assembling a fixed thrust reverser structure of an aircraft propulsion assembly, and to a method for assembling such a fixed structure.

BACKGROUND

The statements in this section merely provide background information related to the present disclosure and may not constitute prior art.

An aircraft is driven by several propulsion assemblies each suspended from a fixed structure of the aircraft, for example under a wing or on the fuselage of the aircraft, via a suspension pylon.

Each propulsion assembly comprises, in a well-known manner, on the one hand a turbojet engine equipped with a fan and an engine, and on the other hand a nacelle covering the turbojet engine and housing a thrust reverser.

A nacelle generally presents a tubular structure comprising an air inlet upstream of the turbojet engine, a median section intended to surround the fan of the turbojet engine, a downstream section housing the thrust reverser and intended to surround a combustion chamber and the turbines of the turbojet engine, and is generally ended by an ejection nozzle, the outlet of which is located downstream of the turbojet engine.

A thrust reverser is adapted, during landing of the aircraft, to improve the braking capacity thereof by redirecting forward at least part of the thrust generated by the corresponding turbojet engine. A thrust reverser generally comprises an outer fixed structure called OFS, an inner fixed structure called IFS which surrounds the engine behind the fan, and a movable structure comprising for example movable cowls. The outer and inner fixed structures define a path intended for the circulation and the exhaust of a cold air flow.

The outer fixed thrust reverser structure comprises, in a well-known manner, in particular a peripheral front frame intended to be mounted on a fan casing of the corresponding turbojet engine, a peripheral rear frame, and a plurality of flow cascades secured between the front and rear frames and extending substantially parallel to the longitudinal geometrical axis of the thrust reverser. The front and rear frames are disposed transversely with respect to the longitudinal geometrical axis of the thrust reverser. The outer fixed structure further comprises a significant number of equipment mounted on the front frame and on either side of the latter, such as cylinders for actuating the movable thrust reverser structure, tubes for guiding the actuating cylinders, brackets for mounting the actuating cylinders, brackets for mounting actuating rods intended to actuate blocking flaps belonging to the movable thrust reverser structure.

Recently, O-shaped thrust reversers (O-Duct) have been developed. The outer fixed structure of a thrust reverser with O-shaped structure extends substantially from one side of the corresponding suspension pylon to the other side of the latter. In order to carry out the assembling of such an outer fixed structure, it is well-known to dispose the front frame substantially horizontally on a handling table, and to assemble the various equipment of the outer fixed structure on the latter.

Such an assembling method induces a significant number of reversals of the front frame in order to gain access to either side of the front frame for the assembling of the various equipment, which require the disposition of suitable handling tools and complicates the assembling of the thrust reverser. In addition, such an assembling method requires the disposition of bridges and scaffolds to access the center of the front frame, which generates significant congestion of the assembling area of such a thrust reverser. Moreover, this assembling method leads to inappropriate postures for the operators who are carrying out the assembling of such thrust reversers. This results in a difficult and costly assembling of such O-shaped thrust reversers.

This results in multiplication of the manufacturing cost of such a thrust reverser. In addition, the assembling is difficult for the operators due to the positions.

SUMMARY

The present disclosure relates to a device for assembling a fixed thrust reverser structure of an aircraft propulsion assembly, the fixed structure comprising a front frame intended to be mounted on a fan casing of a turbojet engine of the propulsion assembly, the assembling device comprising:

a framework intended to rest on a planar support, a support element movably mounted in rotation with respect to the framework about an axis of rotation, a positioning assembly mounted integral in rotation on the support element and on which a front frame is intended to be positioned, and immobilization means arranged to immobilize the front frame on the positioning assembly, the assembling device being configured in such a way that, in the position of immobilization on the positioning assembly, the front frame extends transversely to the planar support, and the positioning assembly and the immobilization means are arranged in such a way that, in the immobilization position on the positioning assembly, the front frame extends transversely to the axis of rotation of the support element.

Such a configuration of the assembling device according to the present disclosure allows an operator to easily access either side of the front frame in the immobilization position of the positioning assembly, and thus to easily assemble on the front frame, and on either side of the latter, the various equipment forming the fixed thrust reverser structure. This assembly is much easier if the operator can position the front frame in the most appropriate position to perform the assembling of each piece of equipment, and this is simply done by rotating the support element about its axis of rotation.

Such a configuration of the assembling device according to the present disclosure also allows reducing the congestion of the assembling area of the fixed structure.

According to one form of the present disclosure, the assembling device is configured in such a way that, in the immobilization position on the positioning assembly, the front frame extends substantially perpendicularly to the planar support.

According to another form of the present disclosure, the positioning assembly is removably mounted on the support element.

In other form of the present disclosure, the axis of rotation of the support element is substantially horizontal under conditions of use of the assembling device. Preferably, the angle of inclination of the axis of rotation of the support element with respect to the horizontal is comprised between −20 and +20°, preferably between −10 and +10° and advantageously between −5 and +5°.

Advantageously, the positioning assembly and the immobilization means are arranged in such a way that, in the immobilization position on the positioning assembly, the front frame extends substantially perpendicularly to the axis of rotation of the support element. In another form, the angle of inclination of the axis of rotation of the support element with respect to the front frame in the immobilization position is comprised between 70 and 110°, alternately between 80 and 100°, and advantageously between 85 and 95°.

As one form according to the present disclosure, the assembling device is arranged in such a way that, in the immobilization position on the positioning assembly, the front frame is substantially centered with respect to the axis of rotation of the support element.

According to another form of the present disclosure, the support element includes a longitudinal axis substantially centered on the axis of rotation of the support element. For example, the support element includes a substantially cylindrical outer shroud with an axis substantially centered on the axis of rotation of the support element.

According to another form of the present disclosure, the positioning assembly comprises at least one positioning element presenting a peripheral mounting wall on which the front frame is intended to be mounted. In one form, the front frame is intended to bear against the peripheral mounting wall.

The peripheral mounting wall can be delimited by a substantially cylindrical surface portion. The peripheral mounting wall can be substantially centered on the axis of rotation of the support element.

In still other form, the positioning assembly comprises a connecting reinforcement mounted on the support element, the at least one positioning element being mounted on the connecting reinforcement.

According to one form of the present disclosure, the positioning assembly comprises two positioning elements.

According to another form of the present disclosure, each positioning element extends in a circular arc.

In an advantageous manner, the peripheral mounting wall comprises a plurality of mounting orifices arranged to cooperate with the immobilization means. Advantageously, the mounting orifices arranged on the peripheral mounting wall are oblong and preferably extend substantially in parallel with the axis of rotation of the support element.

According to one form of the present disclosure, the immobilization means include at least one immobilization member, such as an immobilization pin, movably mounted between an immobilization position of the front frame in which the at least one immobilization member is arranged to extend through an opening arranged in the front frame and one of the mounting orifices belonging to the peripheral mounting wall, and a release position of the front frame.

According to another form of the present disclosure, the immobilization means include at least one clamping member movably mounted between a clamping position of the front frame in which the at least one clamping member is arranged to exert a pressure against the front frame so as to press the front frame against the peripheral mounting wall, and a release position of the front frame.

In an advantageous manner, the immobilization means include a plurality of immobilization elements angularly shifted from one another with respect to the axis of rotation of the support element. Each immobilization element includes for example at least one clamping member and/or at least one immobilization member.

According to one form of the present disclosure, each immobilization element includes an actuating lever connected to the at least one corresponding clamping member and/or the at least one corresponding immobilization member, the actuating lever being pivotally mounted between a first position in which the at least one corresponding clamping member and/or the at least one corresponding immobilization member is in its release position, and a second position in which the at least one corresponding clamping member and/or the at least one corresponding immobilization member are in their clamping and immobilization position, the actuating lever being arranged in such a way that a displacement of the actuating lever between its first and second positions causes a displacement of the at least one corresponding clamping member and/or the at least one corresponding immobilization member between their release position and their clamping and immobilization position.

Each immobilization element is preferably mounted on the positioning assembly, for example on the at least one positioning element.

According to another form of the present disclosure, the assembling device comprises holding means mounted on the support element and arranged to hold the front frame on the support element. The holding means are, for example, removably mounted on the support element. According to one form of the present disclosure, the holding means include a plurality of holding arms angularly shifted from one another with respect to the axis of rotation of the support element. Advantageously, each holding arm comprises a connecting portion provided with a securing eyelet intended for the passage of a securing pin. In one form, each arm extends substantially radially with respect to the longitudinal axis of the support element. The arms are mounted for example on the outer shroud of the support element.

According to another form of the present disclosure, the assembling device comprises rotatably driving means arranged to drive in rotation the support assembly about its axis of rotation. Advantageously, the rotatably driving means include a drive shaft with a longitudinal axis substantially coincident with the axis of rotation of the support assembly, and a steering wheel coupled to the drive shaft and arranged to drive in rotation the drive shaft about its longitudinal axis.

According to one form of the present disclosure, the immobilization means include securing means arranged to secure the ends of the front frame of the positioning assembly.

The securing means include for example:
a first and second securing portions mounted on the positioning assembly and each provided with a securing orifice, and
a first and second securing pins intended to extend respectively on the one hand through an opening arranged in a support portion of the front frame on which flow cascades are intended to be mounted, and on the other hand through the securing orifice belonging to one of the first and second securing portions.

According to another form of the present disclosure, the assembly device includes blocking means mounted on the positioning assembly and arranged to block in position two maintenance rails with respect to the front frame in view of their mounting on the front frame, said maintenance rails being intended to be slidably mounted on the suspension pylon intended to receive the propulsion assembly.

The present disclosure further relates to a method for assembling a fixed thrust reverser structure of an aircraft propulsion assembly, comprising the steps consisting of:

provide an assembling device according to the present disclosure, positioning a front frame of the fixed structure on the positioning assembly, immobilizing the front frame on the positioning assembly using immobilization means, and assembling various pieces of equipment on the front frame so as to form the fixed structure, the assembling step comprising at least one step consisting of driving in rotation the support element about its axis of rotation.

According to one implementation mode of the present disclosure, the positioning step consists of centering the front frame on the axis of rotation of the support element.

According to another implementation mode of the present disclosure, the front frame extends substantially in a circular arc. According to other implementation mode of the present disclosure, the front frame extends over an angle comprised between 270 and 340°. The front frame presents for example a substantially annular shape.

According to an implementation mode of the present disclosure, the assembling step comprises at least one step consisting of securing a rear frame of the fixed structure on the front frame via spacing parts secured on the one hand on the front frame and on the other hand on the rear frame.

According to an implementation mode of the present disclosure, the assembling step comprises the steps consisting of:

holding the front frame on the support element by means of the holding means, releasing the front frame from the positioning assembly, dismounting the positioning assembly of the support element, and assembling a connecting part on the front frame, said connecting part being intended to be mounted on the fan casing of the turbojet engine of the propulsion assembly.

According to an implementation mode, the connecting part has a substantially J-shaped section.

According to another implementation, the method comprises a step prior to the positioning step of the front frame consisting of assembling a connecting part on the front frame, said connecting part being intended to be mounted on the fan casing of the turbojet engine of the propulsion assembly.

According to an implementation mode, the assembling step comprises a step of displacing the assembling device successively along different assembling stations.

According to another implementation mode, the assembling method comprises a step consisting of displacing the assembling device up to a station for mounting the fixed structure on the turbojet engine of a propulsion assembly.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

In any case, the present disclosure will be better understood from the following description with reference to the accompanying schematic drawings representing, by way of non-limiting example, a form of execution of this assembling device.

FIG. 3 is a perspective front view of the assembling device of FIG. 1 on which a front frame of a fixed thrust reverser structure is mounted;

FIG. 4 is a partial perspective top view of the assembling device of FIG. 1;

FIG. 5 is a perspective view, on an enlarged scale, of an immobilization element of the assembling device of FIG. 1;

DETAILED DESCRIPTION

Figure 1:
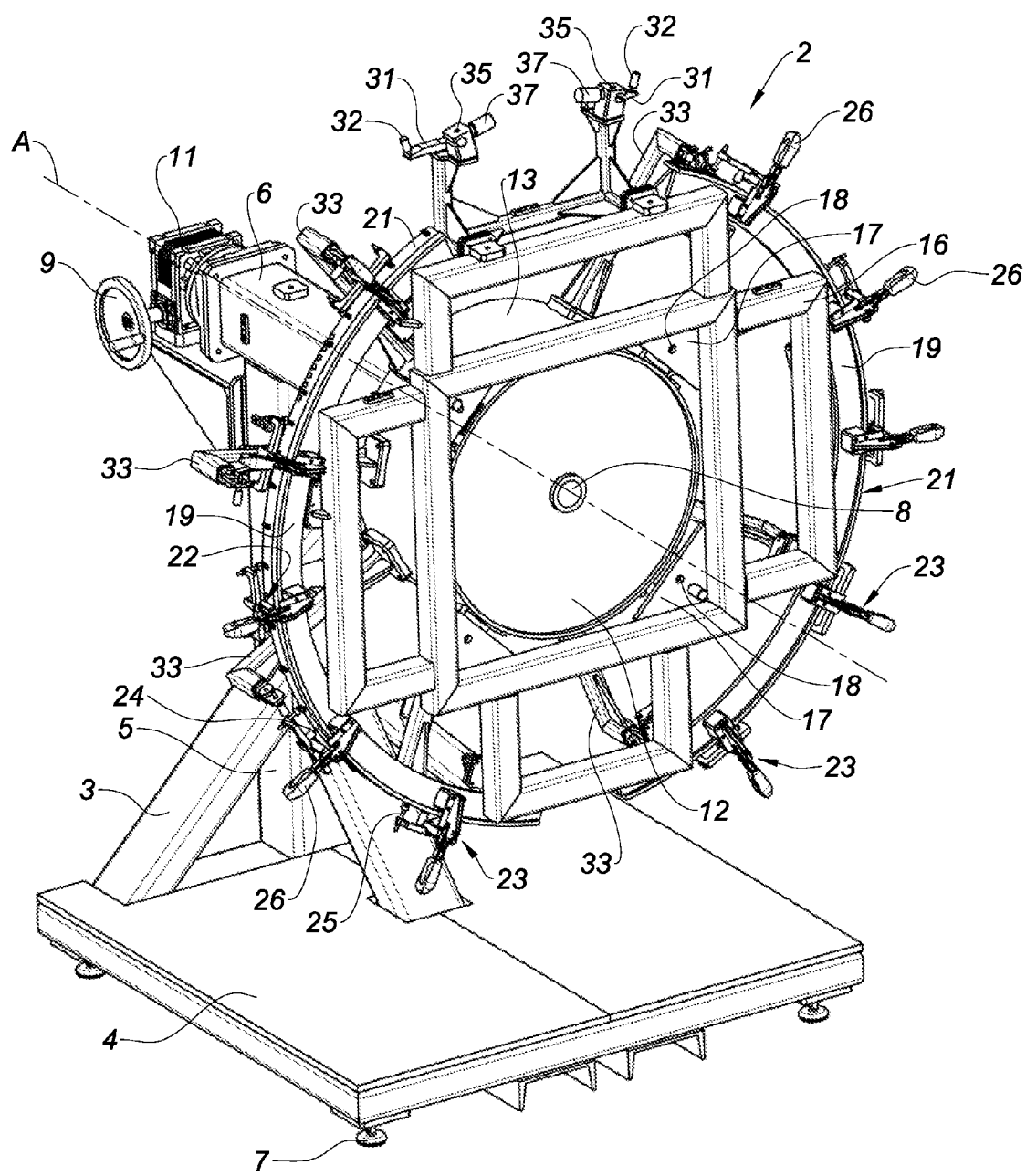
FIG. 1 is a perspective front view of an assembling device according to the present disclosure.

The following description is merely exemplary in nature and is not intended to limit the present disclosure, application, or uses. It should be understood that throughout the drawings, corresponding reference numerals indicate like or corresponding parts and features.

Figure 2:
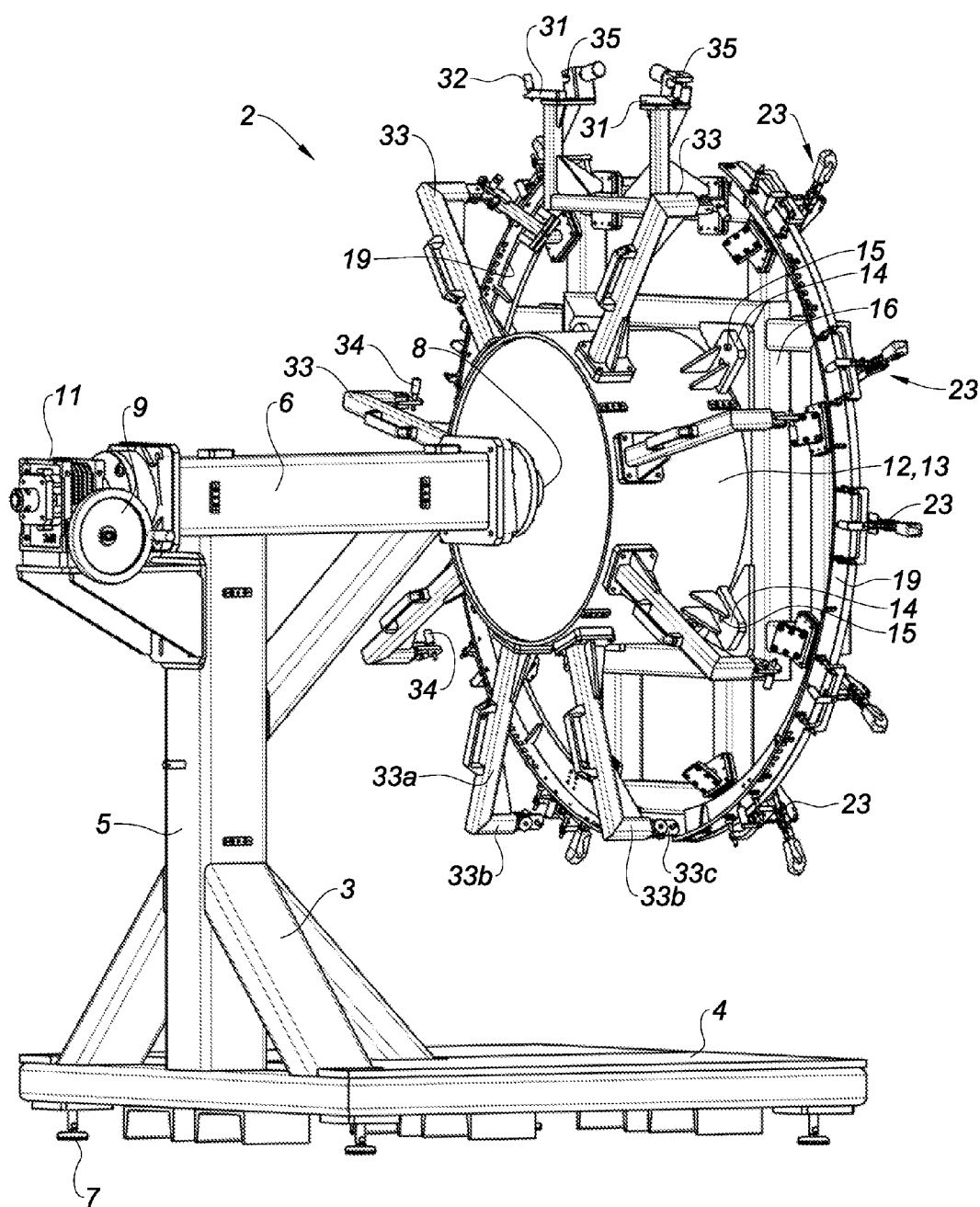
FIG. 2 is a perspective rear view of the assembling device of FIG. 1.

FIGS. 1 and 2 represent an assembling device 2 in an O-shaped fixed thrust reverser structure of an aircraft propulsion assembly, and more particularly an outer fixed structure called OFS.

The assembling device 2 comprises a framework 3 and a platform 4 resting on the framework 3. The framework 3 comprising in particular a substantially vertical upright 5 and a beam 6 integral with the upright 5 and substantially horizontal. The framework 3 is particularly equipped with bearing pads 7 intended to rest on the ground.

The assembling device 2 also comprises a drive shaft 8 with a substantially horizontal longitudinal axis A extending through the beam 6, and a steering wheel 9 coupled to the drive shaft 8, for example via a reducer 11. The steering wheel 9 is arranged to drive in rotation the drive shaft 8 about its longitudinal axis.

The assembling device 2 also comprises a support drum 12 integral in rotation with the drive shaft 8. The support drum 12 includes a substantially cylindrical shroud 13 with an axis centered on the longitudinal axis A of the drive shaft 8. The support drum 12 includes a plurality of securing plates 14 secured to the outer surface of the shroud 13 and extending substantially radially with respect to the shroud 13. Each securing plate 14 is advantageously provided with at least one securing orifice 15.

The assembling device 2 further comprises a connecting reinforcement 16 extending substantially perpendicularly to the longitudinal axis A of the drive shaft 8, and in particular substantially vertically. The connecting reinforcement 16 is removably mounted on the support drum 12. The connecting reinforcement 16 alternately includes a plurality of securing plates 17 each provided with at least one securing orifice 18. Each securing plate 17 is arranged to be secured by screwing or bolting to one of the securing plates 14 of the support drum 12.

The assembling device 2 further comprises two positioning elements 19 integral with the connecting reinforcement 16, and symmetrically disposed with respect to the support drum 12. The connecting reinforcement 16 and the two positioning elements 19 advantageously form a removable positioning assembly.

The two positioning elements 19 extend substantially vertically. Each positioning element 19 presents a substantially circular arc shape, and includes a peripheral mounting wall 21 on which a front frame of the fixed thrust reverser structure is intended to bear directly or indirectly.

According to the form represented in the drawings, the peripheral mounting wall 21 of each positioning element 19 is delimited by a portion of a cylindrical surface centered on the longitudinal axis A of the drive shaft 8. The peripheral mounting wall 21 of each positioning element 19 comprises a plurality of mounting orifices 22 distributed longitudinally along the peripheral mounting wall 21. Each mounting orifice 22 may for example be oblong and extend substantially in parallel with the longitudinal axis A of the drive shaft 8.

The assembling device 2 also comprises immobilization means arranged to immobilize the front frame on the positioning elements 19 and the positioning reinforcement 16.

According to the form represented in the drawings, the immobilization means include a plurality of immobilization elements 23 mounted on the positioning elements 19, and angularly shifted from one another with respect the longitudinal axis A of the drive shaft 8. Each immobilization element 23 includes an immobilization member 24, such as an immobilization pin, movably mounted between an immobilization position of the front frame in which the immobilization element 24 is arranged to extend through an opening arranged in the front frame and one of the mounting orifices 22 arranged on the peripheral mounting wall 21 of the corresponding positioning element 19, and a release position of the front frame in which the immobilization element 24 is located distant from the corresponding positioning element 19.

Each immobilization element 23 also includes two clamping members 25 disposed on either side of the corresponding immobilization member 24. The two clamping members 25 of each immobilization element 23 are movably mounted between a clamping position of the front frame in which the clamping members 25 are arranged to exert a pressure against the front frame so as to press the front frame against the peripheral mounting wall 21 of the corresponding positioning element 19, and a release position of the front frame in which the clamping members 25 are located distant from the corresponding positioning element 19.

Each immobilization element 23 also includes an actuating lever 26 connected to the corresponding immobilization and clamping members 24, 25. The actuating lever 26 of each immobilization element 23 is pivotally mounted between a first position in which the corresponding immobilization and clamping members 24, 25 are in their release position, and a second position in which the corresponding immobilization and clamping members 24, 25 are in their immobilization and clamping position. The actuating lever 26 is advantageously arranged in such a way that the displacement of the actuating lever 26 between its first and second positions causes a displacement of the corresponding immobilization and clamping members 24, 25 between their release position and their immobilization and clamping position.

As shown more particularly in FIG. 5, each immobilization element 23 advantageously forms a toggle clamp. Therefore, each immobilization element 23 comprises a chassis 27 mounted on the corresponding positioning element 19, the corresponding actuating lever 26 being pivotally mounted on the chassis 27 about a pivot axis. Each immobilization element 23 also comprises a support member 28 pivotally mounted on the chassis 27 about a pivot axis parallel to the pivot axis of the corresponding actuating lever 26, the corresponding immobilization and clamping members 24, 25 being mounted on the support member 28. Each immobilization element 23 further comprises at least one link 29 the ends of which are hingedly mounted respectively on the support member 28 and the corresponding actuating lever 26.

The immobilization means also include securing means arranged to secure the ends of the front frame on the connecting reinforcement 16. As shown more particularly in FIG. 4, the securing means advantageously include two securing parts 31 mounted on the connecting reinforcement 16, and two securing pins 32 intended to extend respectively through, on the one hand, an opening arranged in a support portion of the front frame on which flow cascades are intended to be mounted, and on the other hand, a securing orifice (not visible in the drawings) arranged in one of the securing parts 31.

The assembling device 2 further comprises two holding means removably mounted on the support drum 12, and arranged to hold the front frame on the support drum 12.

According to the form shown in the drawings, the holding means include a plurality of holding arms 33 angularly shifted from one another with respect the longitudinal axis A of the drive shaft 8. Each holding arm 33 comprises a securing portion 33a mounted on the outer surface of the shroud 13 of the support drum 12, and extending substantially radially from the shroud 13. Each holding arm 33 comprises furthermore a connecting portion 33b integral with the corresponding securing portion 33a, and extending substantially parallel to the longitudinal axis A of the drive shaft 8 in the direction of the positioning elements 19. Each holding arm 33 further comprises a connecting portion 33c hingedly mounted on the corresponding connecting portion 33b about a hinge axis substantially perpendicular to the longitudinal axis A of the drive shaft 8, in order to facilitate the securing of said holding arm 33 on the front frame.

The connecting portion 33c of each holding arm 33 alternately cooperates with a securing clevis mounted on the front frame. Therefore, the connecting portion 33c is advantageously provided with a securing eyelet intended for the passage of a securing pin 34 able to cooperate also with the corresponding securing clevis.

Figure 7:
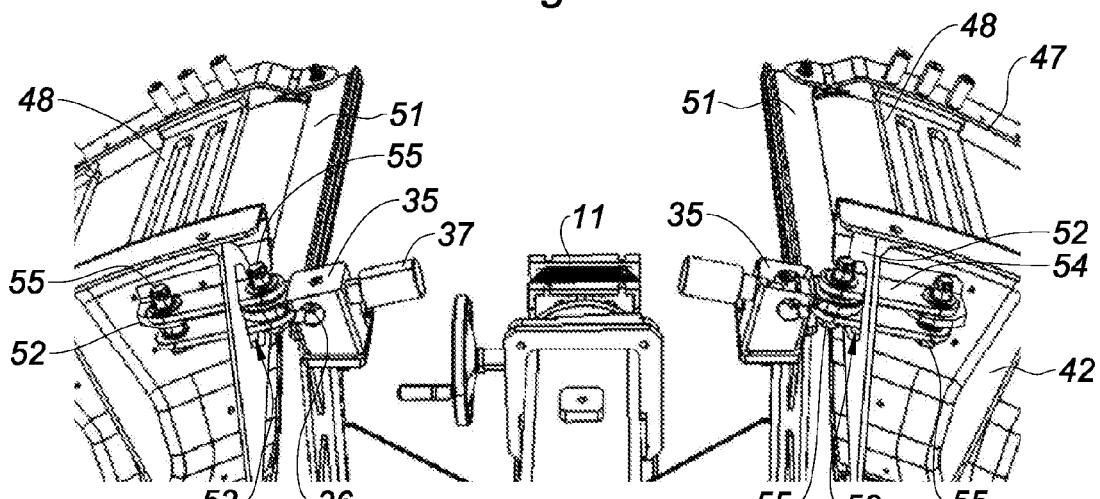
FIG. 7 is a partial perspective top view of the assembling device of FIG. 1 showing the means for blocking the maintenance rails.

According to one form of the present disclosure, the assembling device 2 further includes blocking means mounted on the connecting reinforcement 16 and arranged to block in position two maintenance rails with respect to the front frame in view of their mounting on the latter. Such maintenance rails are intended to be slidably mounted on a suspension pylon of an aircraft. As shown more particularly in FIG. 7, the blocking means advantageously include two clamping elements 35 each provided with a reception housing 36 intended to receive a ledge of the corresponding maintenance rail, and a pressure member 37 opening into the corresponding reception housing 36 and arranged to exert pressure against the corresponding ledge of the maintenance rail.

A method for assembling a fixed structure 40 of a thrust reverser 60 of an aircraft propulsion assembly by means of the assembling device 2 according to the present disclosure will now be described.

The assembling method comprising the following steps:

positioning two half-frames 41 forming a front frame 42 of the fixed structure on the positioning elements 19, immobilizing each half-frame 41 on the connecting reinforcement 16 by introducing a securing pin 32 on the one hand in a securing orifice 43 arranged on a support wall 44 of said half-frame 41, and on the other hand in a securing orifice arranged in the corresponding securing part 31, immobilizing each half-frame 41 on the corresponding positioning assembly 19 by means of the corresponding immobilization elements 23, and this is done by displacing the actuating lever 26 of said immobilization elements 23 in their second position, assembling the two half-frames 41 to one another via a fishplate 45 positioned at "6 o'clock"

assembling various equipment on the front frame 42 and on both sides thereof so as to form the fixed structure.

The step of assembling the various equipment comprises at least one step comprising driving in rotation the support drum 12 using the steering wheel 9 in order to position the front frame 42 in an appropriate position, so as to facilitate the assembling of the various equipment.

Figure 6:
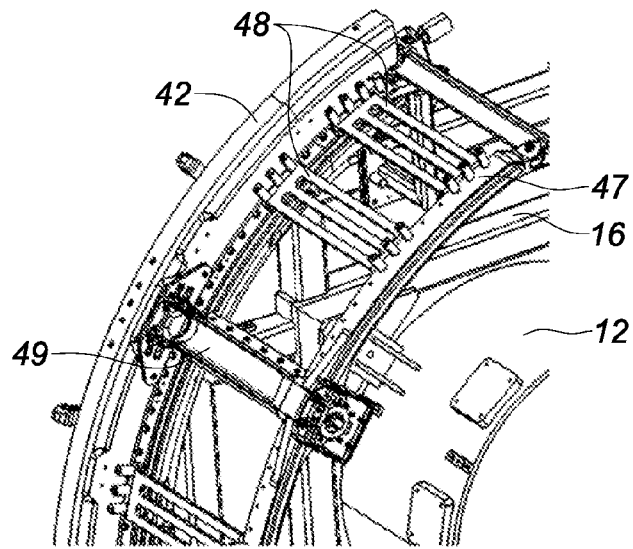
FIG. 6 is a partial perspective rear view of the assembling device of FIG. 1 on which are mounted the front and rear frames of a fixed thrust reverser structure.
Figure 8:
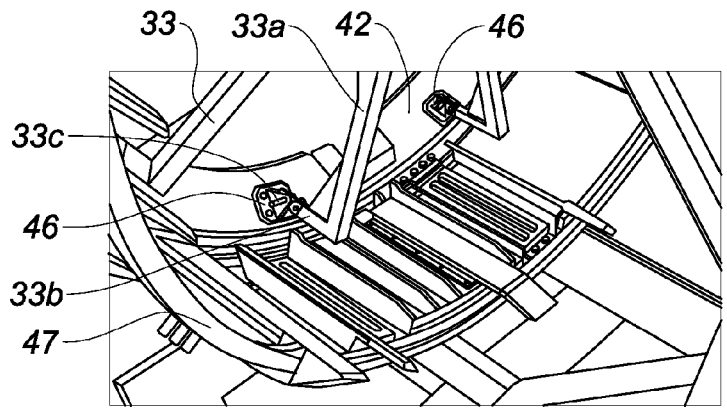
FIG. 8 is a partial perspective rear view of the assembling device of FIG. 1.
Figure 10:
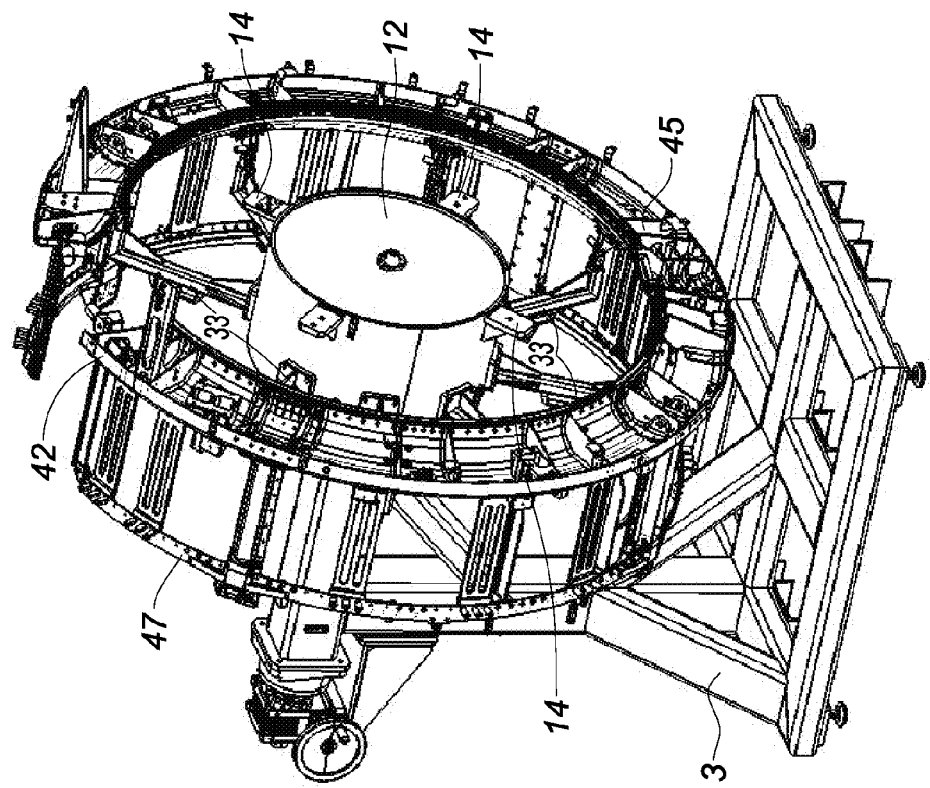
FIGS. 9 and 10 are perspective front views of the assembling device of FIG. 1, respectively showing the assembling device equipped with and deprived from its positioning assembly.
Figure 9:
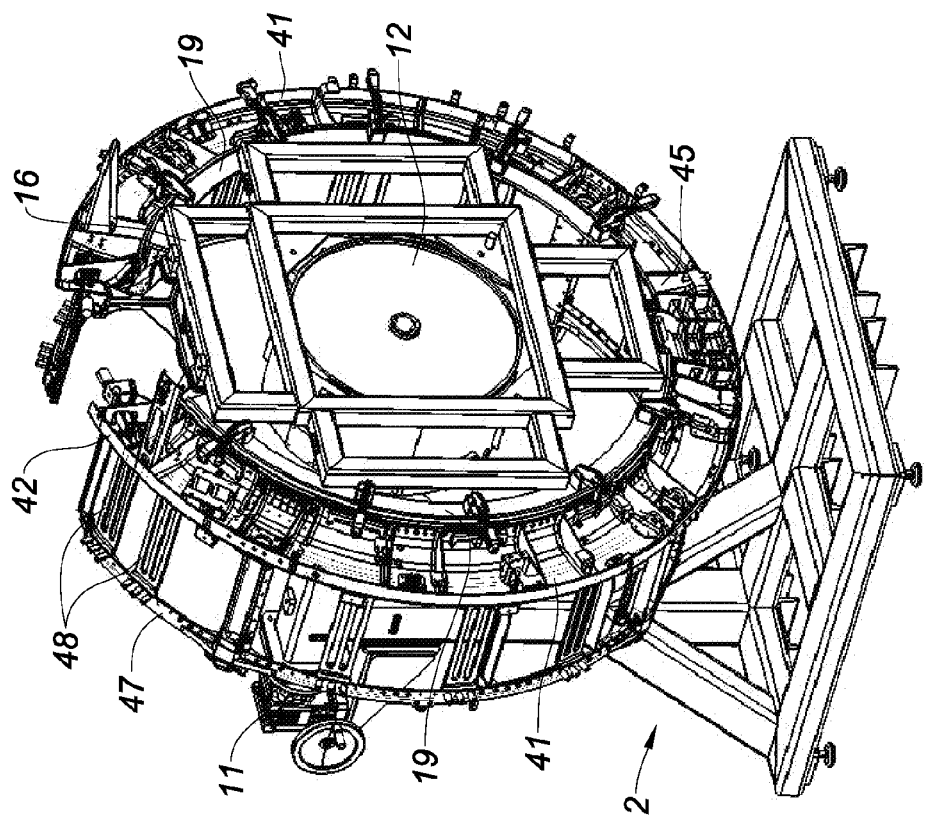

The step of assembling the various equipment comprises in particular the following steps:

securing brackets 46 on the front frame 42 (see FIG. 8), said securing brackets 46 being intended for securing actuating rods adapted to actuate blocking flaps belonging to the movable structure 70 of the thrust reverser, securing a rear frame 47 of the fixed structure on the front frame 42 by means of spacing parts 48, each spacing part 48 having a first end secured on the front frame 42 and a second end secured on the rear frame 47, each spacing part 48 having a length corresponding to the length of the flow cascades intended to equip the fixed structure, securing guide tubes 49 on the front and rear frames 42, 47 (see FIG. 6), said guide tubes 49 being intended for guiding the various actuation cylinders of the movable structure of the thrust reverser, securing maintenance rails 51 on the rear frame 47 (see FIG. 7), immobilizing the maintenance rails 51 with respect to the front frame 42 using clamping members 35, securing two mounting brackets 52 at the ends of the front frame 42, that is to say, "12 o'clock", each mounting bracket 52 being provided with a passage clearance 53, introducing at least one rod 54 through each passage port 53 securing the ends of each rod 54 respectively on the mounting brackets 52 and the corresponding maintenance rail 51 using securing pins 55.

Figures 11, 12:
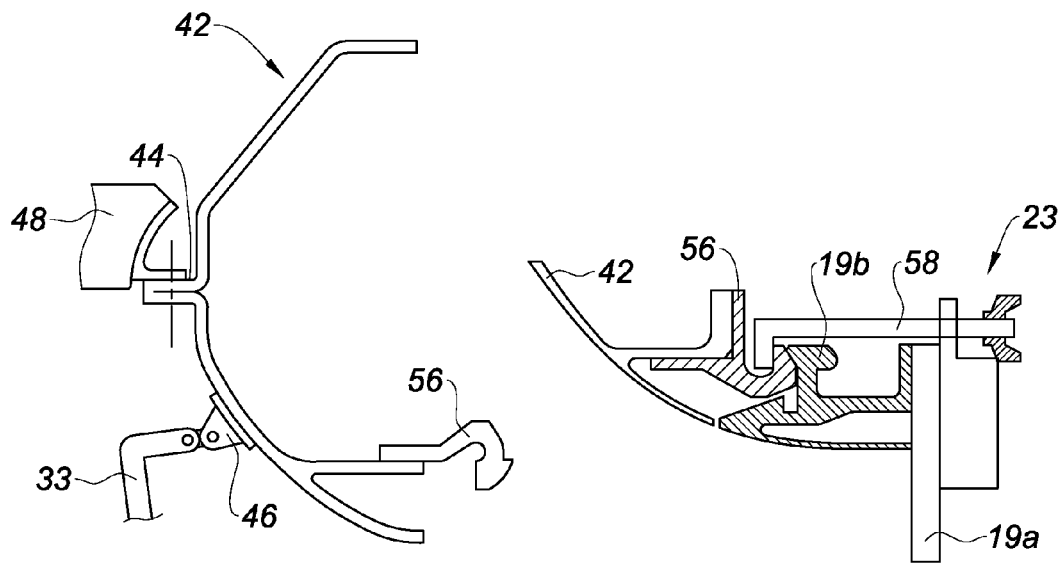
FIG. 11 is a schematic sectional view of a front frame equipped with a connecting part and held on a support element of the assembling device of FIG. 1.
FIG. 12 is a schematic sectional view of a front frame equipped with a connecting part and immobilized on the positioning assembly of the assembling device of FIG. 1.
Figure 13:
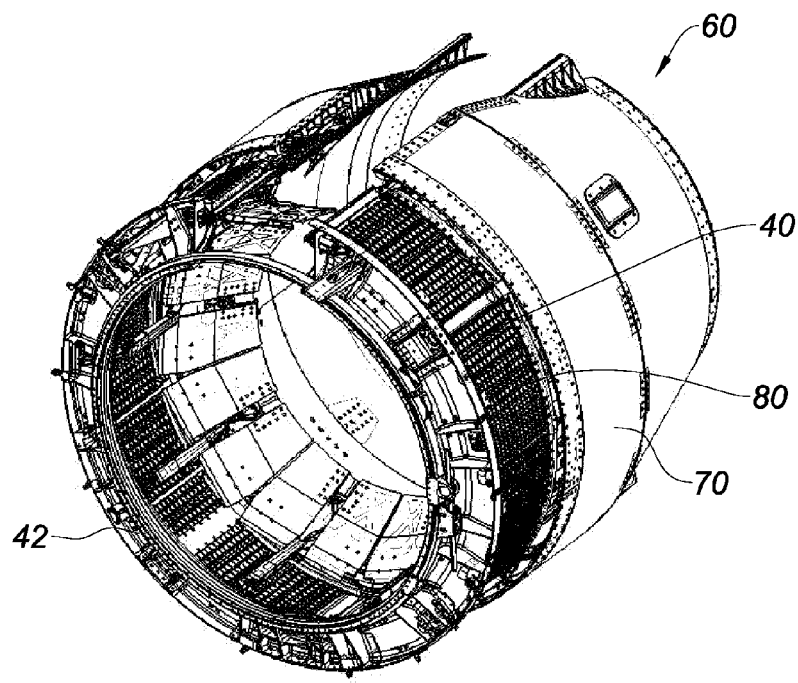
FIG. 13 is a perspective view of a thrust reverser comprising a fixed structure assembled using the assembling device of FIG. 1.

According to an implementation mode of the assembling method, the step of assembling the various equipment comprises in particular the following steps:

mounting the holding arms 33 on the support drum 12, securing the holding arm 33 on the securing brackets 46 so as to hold the front frame 42 on the support drum 12, releasing the front frame 42 from each positioning element 19 and from the connecting reinforcement 16 dismounting the connecting reinforcement 16 from the support drum 12, assembling a connecting part 56, such as an annular flange, having a J-shaped section, also called a J-ring, on the front frame 42 (see FIG. 11), said connecting part 56 being intended to be mounted on the fan casing of the turbojet engine of the propulsion assembly, dismounting the spacing parts 48, securing the rest of the equipments forming the fixed structure on the front and rear frames 42, 47, such as in particular the flow cascades 80.

According to an implementation mode, the assembling method comprises a step of displacing the assembling device 2 successively along various assembling stations, in order to carry out the assembling of the fixed thrust reverser structure.

According to another implementation mode, the assembling method comprises a step of displacing the assembling device 2 up to a mounting station of the fixed structure on the turbojet engine of a propulsion assembly.

According to another implementation of the assembling method, the connecting part 56 could be mounted on the front frame 42 prior to its positioning on the positioning elements 19. According to this implementation of the method, the front frame 42 is mounted on the positioning elements 19 via said connecting part 56. In such a case, each positioning element 19 includes a mounting portion 19a mounted on the connecting reinforcement 16, and a positioning portion 19b integral with the mounting portion 19b and on which the connecting part 56 is intended to be mounted. According to such a form, each immobilization element 23 could include a clamping member 58 arranged to exert pressure against the connecting part 56 so as to press the connecting part 56 against the mounting portion 19b.

As it goes without saying, the present disclosure is not limited to the sole form of this assembling device, described above by way of example, it encompasses on the contrary all the alternative forms. This is particularly how the assembling device could be used to assemble the fixed structure of a thrust reverser of the C-duct type.

What is claimed is:

1. An assembling device for a fixed thrust reverser structure of an aircraft propulsion assembly, the fixed thrust reverser structure comprising a front frame mounted on a fan casing of a turbojet engine of the propulsion assembly, the assembly device comprising:
a framework resting on a planar support;
a support element mounted in rotation with respect to the framework about an axis of rotation;
a positioning assembly mounted in rotation on the support element and on which the front frame is positioned; and immobilization means arranged to immobilize the front frame on the positioning assembly, wherein the assembling device is configured in such a way that, in a immobilization position on the positioning assembly, the front frame extends transversely to the planar support, and the positioning assembly and the immobilization means are arranged in such a way that, in the immobilization position on the positioning assembly, the front frame extends transversely to an axis of rotation of the support element.

2. The assembling device according to claim 1, wherein the positioning assembly is removably mounted on the support element.

3. The assembling device according to claim 1, wherein the axis of rotation of the support element is substantially horizontal under conditions of use of the assembling device.

4. The assembling device according to claim 1, wherein the positioning assembly comprises at least one positioning element presenting a peripheral mounting wall on which the front frame is mounted.

5. The assembling device according to claim 4, wherein the peripheral mounting wall comprises a plurality of mounting orifices arranged to cooperate with the immobilization means.

6. The assembling device according to claim 5, wherein the immobilization means comprises at least one immobilization member movably mounted between the immobilization position of the front frame in which the at least one immobilization member is arranged to extend through an opening arranged in the front frame and one of the mounting orifices, and a release position of the front frame.

7. The assembling device according to claim 6, wherein the at least one immobilization member is an immobilization pin.

8. The assembling device according to claim 4, wherein the immobilization means comprises at least one clamping member movably mounted between a clamping position of the front frame in which the at least one clamping member is arranged to exert a pressure against the front frame so as to press the front frame against the peripheral mounting wall, and a release position of the front frame.

9. The assembling device according to claim 1, wherein the immobilization means comprises a plurality of immobilization elements angularly shifted from one another with respect to the axis of rotation of the support element.

10. The assembling device according to claim 9, wherein each immobilization element comprises at least one of a clamping member and an immobilization member.

11. The assembling device according to claim 10, wherein each immobilization element comprises an actuating lever connected to at least one of a corresponding clamping member and a corresponding immobilization member, the actuating lever being pivotally mounted between a first position in which at least one of the corresponding clamping member and the corresponding immobilization member are in a release position, and a second position in which at least one of the corresponding clamping member and the corresponding immobilization member are in a clamping and the immobilization position, the actuating lever being arranged in such a way that a displacement of the actuating lever between its first and second positions causes a displacement of at least one of the corresponding clamping member and the corresponding immobilization member between the release position and the clamping and immobilization positions thereof.

12. The assembling device according to claim 1, further comprising holding means mounted on the support element and arranged to hold the front frame on the support element.

13. The assembling device according to claim 12, wherein the holding means are removably mounted on the support element.

14. The assembling device according to claim 12, wherein the holding means comprises a plurality of holding arms angularly shifted from one another with respect to the axis of rotation of the support element.

15. The assembling device according to claim 1, further comprising rotatably driving means arranged to drive in rotation the support element about the axis of rotation thereof.

16. A method for assembling a fixed thrust reverser structure of an aircraft propulsion assembly, comprising the following steps:
  supplying the assembling device according to claim 1,
  positioning the front frame on the fixed thrust reverser structure of the positioning assembly;
  immobilizing the front frame on the positioning assembly by means of the immobilization means; and
  assembling various equipment on the front frame so as to form the fixed thrust reverser structure, the assembling step comprising at least one step comprising driving in rotation the support element about the axis of rotation thereof.

17. The assembling method according to claim 16, wherein the assembling step comprises the following steps:
  holding the front frame on the support element using holding means;
  releasing the front frame from the positioning assembly;
  dismounting the positioning assembly from the support element; and
  assembling a connecting part on the front frame, said connecting part being mounted on the fan casing of the turbojet engine of the propulsion assembly.

* * * * *